United States Patent [19]

Schultz et al.

[11] 4,106,792
[45] Aug. 15, 1978

[54] LOCKING MECHANISM ARRANGEMENT FOR A HINGED BUS

[75] Inventors: Otto Schultz; Hilmar Feutlinske, both of Hamburg, Fed. Rep. of Germany

[73] Assignee: Hamburger Hochbahn Aktiengesellschaft, Hamburg, Fed. Rep. of Germany

[21] Appl. No.: 744,402

[22] Filed: Nov. 23, 1976

Related U.S. Application Data

[63] Continuation-in-part of Ser. No. 572,097, Apr. 28, 1975, abandoned.

[30] Foreign Application Priority Data

Apr. 26, 1974 [DE] Fed. Rep. of Germany ....... 2420203

[51] Int. Cl.² ............................................. B62D 53/06
[52] U.S. Cl. ................................................... 280/432
[58] Field of Search .............. 280/400, 403, 426, 432, 280/474, 424; 180/134

[56] References Cited

U.S. PATENT DOCUMENTS

| 2,315,688 | 4/1943 | Crawford | 280/424 |
| 2,407,007 | 9/1946 | Henrichsen | 280/403 X |
| 2,461,212 | 2/1949 | Hanna | 280/432 |
| 3,250,547 | 5/1966 | Myers | 280/432 |
| 3,618,983 | 11/1971 | Forse | 280/432 |

Primary Examiner—Joseph F. Peters, Jr.
Assistant Examiner—R. Schrecengost
Attorney, Agent, or Firm—Sherman & Shalloway

[57] ABSTRACT

A blocking and damping system for a hinged bus having front and rear sections with a rear drive located in the rear section for the prevention of exceeding a maximum deflection angle between the front part of the vehicle and a single axle trailer when cornering, comprising hinge blocking means, at least one sensing means for sensing the angle of lock and the deflection angle of said hinge which is predetermined upon reaching a maximum steering deflection angle and stop means operative in one direction against enlargement of the deflection angle. The system may also include a damping system for discouraging relative movement between the front and rear sections.

9 Claims, 7 Drawing Figures

LOCKING MECHANISM ARRANGEMENT FOR A HINGED BUS

This is a continuation-in-part application of application Ser. No. 572,097, which was filed on Apr. 28, 1975 and now abandoned.

BACKGROUND OF THE INVENTION

This invention relates to a locking system for a hinged bus or vehicle. A favorable arrangement of the drive in the case of a hinged bus consists in placing the drive in the rear of the vehicle and to use the axle of the single axle trailer as the driving axle. As a result of such an arrangement, the floor height of the passengers can be expected to be very low and thus more comfortable, while the required minimum height of the roof for standing room can be maintained without difficulty. With regard to combatting noise and with regard to handling in the workshop, this form of drive is likewise advantageous.

On the other hand, such a form of a drive however has the disadvantage, that in case of cornering, undesirable driving characteristics will result, since the thrust exerted by the motor in this case will strive to increase the hinged angle between the front part of the vehicle and the single axle trailer. In the case of unequal and insufficient friction conditions on the ground, this can lead to a slip-over by the occurrence of a too great deflection angle between the two parts of the vehicle.

SUMMARY OF THE INVENTION

An object of the present invention is, in the case of a hinged bus with rear axle drive, to create an arrangement which will prevent exceeding a maximum deflection angle between the front part of the vehicle and the single axle trailer in the case of cornering.

A further object of the present invention is to provide a locking mechanism arrangement for a hinged bus which is characterized by a sensor for the angle of lock and the deflection angle which are connected with a comparator by which a locking mechanism of the hinge acting only in one direction can be operated upon reaching a maximum deflection angle predetermined by the maximum deflection angle.

In the present invention, one starts out from the realization, that in the stable state of cornering, a certain deflection angle of the hinge connecting the two parts of the vehicle is assigned to every angle of lock of the steered wheels. Whenever this angle is exceeded, then this can be traced back only to the fact that the drive of the single axle trailer enlarges the deflection angle by its pushing effect or thrust effect.

Effectively, a locking mechanism may be provided which contains a piston cylinder arrangement which may be hydraulically interconnected. In case of retreat or decrease of the deflection angle, the locking mechanism may remain operable up to a period immediately prior to zero degree, since it acts only in one direction and does not by any means impair the reduction of the angle lock.

In order to prevent a sudden buckling during the driving process with a not-locked hinge, the deflection angle sensor is constructed so as to be effective in such a way, that it will trigger an operation of the locking mechanism in the case of noncontinuous change of the deflection angle.

BRIEF DESCRIPTION OF THE DRAWING

The objects of the present invention will be better understood from the following detailed description, taken in conjunction with the drawings, in which.

DESCRIPTION OF THE PREFERRED EMBODIMENTS

Figure 1:
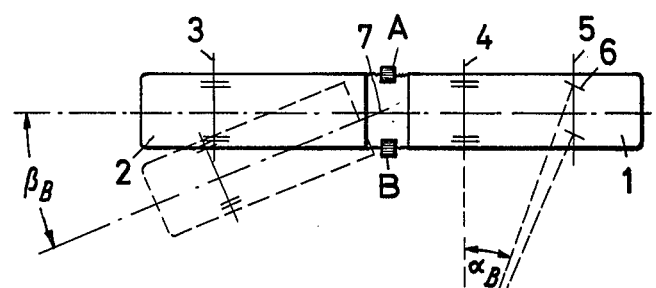
FIG. 1 schematically illustrates a hinged bus in accordance with the present invention.
Figure 2:
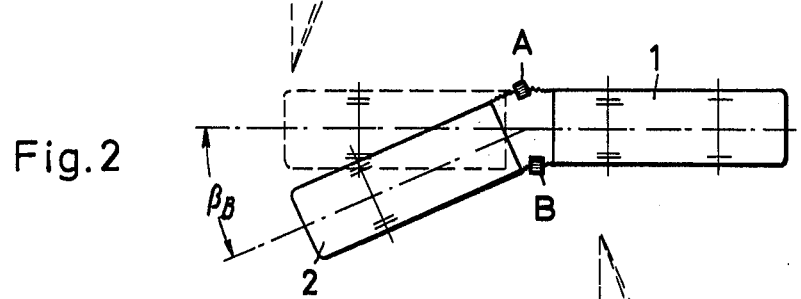
FIGS. 2 and 3 schematically illustrate the hinged bus of FIG. 1 in other states of travel.
Figure 3:
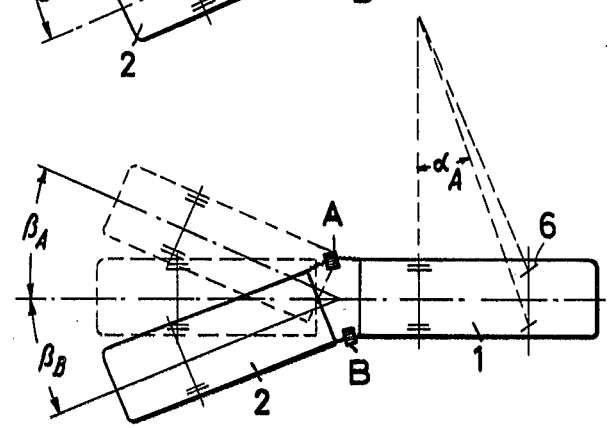

As seen in FIGS. 1–3 the hinged bus vehicle consists of a front part or section 1 of a vehicle and a single axle trailer 2 in which is housed, in the rear part or section, the drive for the hinged bus, which acts on the axle 3 of the single axle trailer with the schematically shown wheels. The front part of the vehicle is provided with two axles 4 and 5, whereby the front axle is provided with wheels 6, which are adjustable in accordance with the steering deflection in order to change the direction of travel. The front part of the vehicle 1 and the single axle trailer 2 are connected with one another by means of a hinge joint with a pivot 7. In case of cornering, there is an angle of lock $\alpha$ between the wheels 6 of the front axle 5 and the axle 4 of the front part 1 of the vehicle. In the course of cornering, the hinge joint turns around the pivot 7, so that between the longitudinal axle of the front part 1 of the vehicle and the longitudinal axle of the single axle trailer 2, there occurs a deflection angle $\beta$ such as can be seen, for example, from FIG. 1, where the single axle trailer 2 assumes the position shown in a dotted line with regard to the front part 1 of the vehicle. Stops A and B may be provided on a hinge joint (not shown), which act only in one direction against an enlargement of the deflection angle $\beta$. Corresponding to the direction of the deviation of the steering deflection of the front wheel 6 respectively of the single axle trailer 2, either in the direction of stop A or B, the angle of lock and the deflection angle $\alpha$ respectively $\beta$ may be provided with corresponding stops A and B.

The angle of lock $\alpha$ is measured by means of a sensor 20 and the deflection angle $\beta$ by means of a sensor 21. This is accomplished, for example, by means of the measurement of the angle of rotation of the hinge joint respectively of the angular position of the front wheel 6 in relation to the longitudinal axis of the front part 1 of the vehicle. The corresponding signals may be fed into a logical circuit, which has a computer 22 which calculates the maximum deflection angle $\beta$ at the angle of lock $\alpha$ as measured and which delivers a corresponding signal to a comparator 23. The second inlet of the comparator 23 is fed by the sensor 21 for the deflection angle, so that the comparator 23 delivers a signal to an electronic switch 24, whenever the maximum permissible deflection angle $\beta_{max}$, calculated by the computer 22 is equal to or larger than the measured deflection angle β. This electronic switch operates a triggering switch 26 corresponding to the deflection angle $\beta_A$ or $\beta_B$ for the stops A or B. Upon reaching, for example, a maximum deflection angle $\beta_{Bmax}$, a pressure is built up in the arrangement of the piston cylinder of the stop B which prevents an enlargement of the deflection angle $\beta_B$.

Whenever the angle of lock $\alpha_B$ returns to 0°, as shown in FIG. 2, then the single axle trailer 2 continuously reaches the position shown in FIG. 2 in a broken line. In that case, the pressure in the piston cylinder arrangement of the stop B remains steady up to shortly before 0°, which can be realized, for example, in such a way that the switch 24 is connected by way of a threshold value switch 25 directly with the sensor 21. Whenever the signal produced as a result of the measurement of the angle β becomes smaller than a threshold value $S_1$, then the threshold value switch 25 delivers a signal to the AND gate of the switch 24, so that in case of receipt of a signal from the comparator 23, the switch 24 is opened and delivers a signal to the triggering switch 26.

Whenever the angle of lock α=0° is changed into an angle of lock $\alpha_A$, while the deflection angle is $\beta_B$, as seen in FIG. 3, the pressure in the piston cylinder arrangement of stop B is maintained for such a length of time until the deflection angle β is equal to 0°. Only upon reaching a deflection angle $\beta_A$, an enlargement of the deflection angle will be prevented in the case where the maximum deflection angle computed by the computer 22 is exceeded, whereby a pressure build-up takes place in the piston cylinder arrangement of the stop A.

The stops A and B may be represented by pneumatic, hydraulic, electromagnetic and/or mechanical forces. In the case of the use of piston cylinder units, these can be interconnected hydraulically whereby, in case of cornering, the liquid is pumped from one of the cylinders over into the other. As long as the deflection angle is not critical, this pumping takes place without hindrance. However, when the maximum deflection angle is reached or exceeded, the hydraulic connection is blocked, for example, by a controllable non-return valve in that direction which corresponds to the enlargement of the deflection angle.

In order to prevent a sudden buckling during travel with a non-locked joint, the deflection angle sensor 21 could also have an arrangement which acts in such a way that in the case of non-continuous changes of the deflection angle, it provides for a triggering of the stop A or B. For this purpose there may be provided that the signal produced by the measurement of the angle β can be put on a differential circuit 27, which produces a signal corresponding to the magnitude of dβ/dt, which controls a following threshold value switch 28 in case of exceeding a threshold value $S_2$ and which produces an output signal upon exceeding the threshold value $S_2$, which operates the triggering switch 26.

The threshold value switches 25 and 28 may, for example, be thyristor circuits.

The stop can also be carried out purely mechanically. For example, the hinge can be provided with a blocking brake which in the braked state prevents a change of the hinged angle. At the same time, care must be taken that the brake is released again in time whenever the joint again strives to extend or stretch. For this purpose measuring arrangements can be provided, for example, on the hinge or on its connections with the parts of the vehicle which determine the direction of force and which in the case of reversal of the direction of force bring about the release the brake. Another possibility consists in the fact of releasing the brake in quick time intervals and to find which tendency for a change of the angle is present in the released state. Such arrangements can be constructed similarly, as known antiblocking arrangements on brakes for vehicles which likewise cause a loosening of the braking effect in short time intervals, and which compare the slip in the braked and unbraked state. Also, in the case of the use according to the invention, the tendency for changing the angle may be determined in the unbraked state. If this tendency is in the extended sense, then the brake can again be released, while it must grab again as long as a tendency of change, which increases the angle, prevails.

Figure 4:
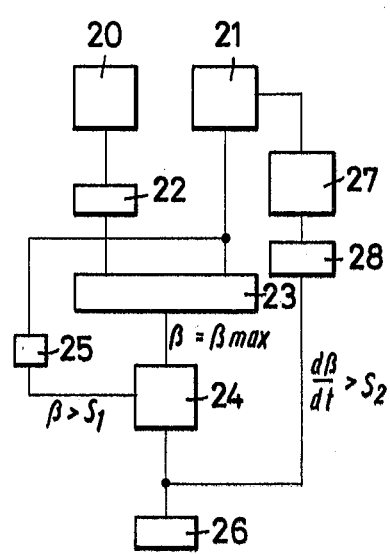
FIG. 4 shows a block diagram of the locking mechanism of the present invention.
Figure 5:
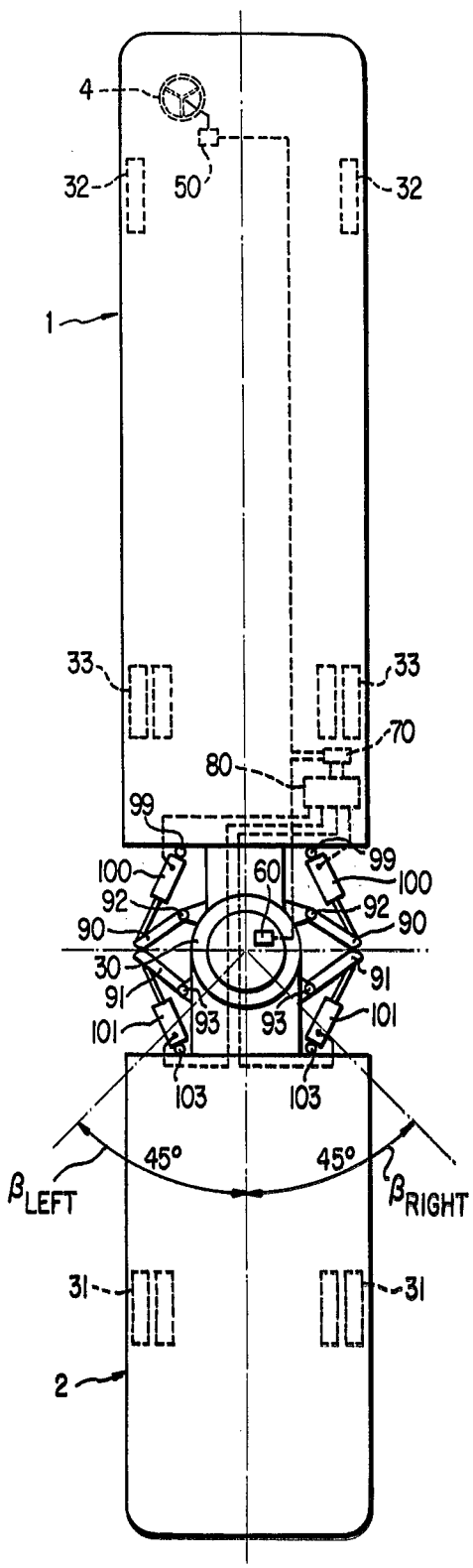
FIG. 5 is a more detailed schematic top view of the hinged bus shown in FIG. 1, showing a steering unit and hinge construction with the sections of the bus aligned.
Figure 6:
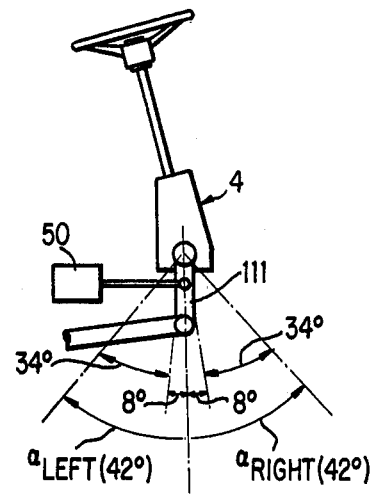
FIG. 6 is a side elevation of a steering unit and sensor shown schematiclly in FIG. 5.

FIGS. 4, 5 and 6

The above-described blocking effect can occur in the range of very small steering or deflection angles. This presents a problem when driving straight at relatively high speeds, since the steering wheel of the vehicle continually moves over center from one side to the other about, a zero value. In prior art approaches this would result in frequent blocking actions. Frequent blocking could be avoided only by a very insensitive adjustment of the device, which is undesirable because the device would not then function properly.

Figure 7:
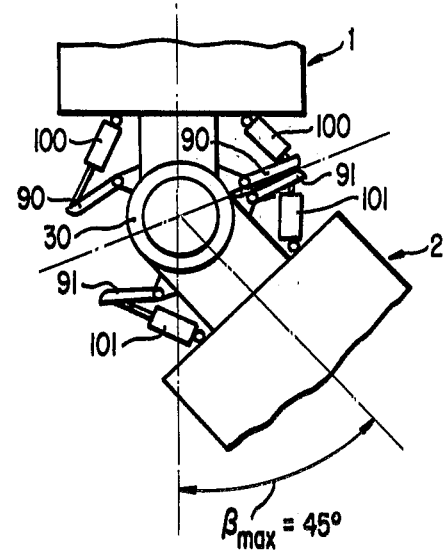
FIG. 7 is a top view of a portion of FIG. 1 showing the hinge of FIG. 1 when the sections of the hinged bus are deflected.

In the embodiment shown in FIGS. 5-7 the blocking device is not effective in a certain range of small angles on either side of the center line for the steering angle. Since this could result in instability of the vehicle in this range of small values of steering angle, the movement of the hinge between the vehicle sections is damped in the range of small steering angles. The damping angle would be larger than the range in which blocking is ineffective, however, the damping angle should be at least as great as the range in which the blocking is ineffective.

The range in which blocking is ineffective depends exclusively on the steering angle and is not dependent on the deflection angle of the hinge. The same is true for the angular range in which damping is effective. Consequently, when driving through curves, blocking is substituted for damping.

The angular range in which blocking is ineffective and in which damping is effective is chosen so that the steering angle does not exceed this range during normal straight driving but exceeds it when driving through curves. A range of 8° to the right and to the left has proved to very satisfactory, however, the range may be increased or decreased.

With the foregoing comments in mind, the phenomenon of damping for straight line motion, and blocking driving vehicle through curves is accomplished by the structure shown in FIGS. 5, 6, and 7. As is shown in FIG. 5, the front section of the vehicle 1 is pushed by the rear section or trailer which has an engine, or the like, that applies a driving force to the single pair of wheels 31 mounted on the trailer. As with the vehicles shown in FIGS. 1, 2 and 3, the front section 1 of the vehicle, or hinged bus, has a pair of steering wheels 32 which can be turned at an angle to the axis of the front section 1 so as to steer the vehicle through curves. The front section 1 also include a pair of supporting wheels 33 adjacent the rear end of the front section. Preferably, the wheels 31 and 33 have double tires while the steering wheels 32 have single tires.

The front section 1 and rear section 2 are connected by a hinge unit 30 which has superimposed on each side thereof pairs of links 90-91. The links 90 are pivoted at one end to the vehicle one by pivot 92 and are pivoted at the other end to hydraulic cylinders 100. Hydraulic cylinders 100 are pivoted at 99 to the front section 1 so that as the links 90 pivot about pivots 92 they work with the hydraulic cylinders 100. The links 91 are pivoted at one end to the trailer 2 at pivot points 93 and at their other ends to hydraulic cylinders 101 which are in turn pivoted to the trailer 2 at pivots 103. As is seen in FIG. 7 when the vehicle goes around a corner the links on one side (in FIG. 7 on the right side) abut against one another whereby the corresponding cylinders tend to be compressed. Each cylinder is connected by a line (shown dotted in FIG. 5) to a reservoir in the unit 80. If said lines are open, the fluid from the compressed cylinders is free to flow through the corresponding lines to the reservoir, and the vehicle is free for further relative rotation in the sense of increasing deflection angle between the front section and the trailer. Each line contains a valve which can be automatically controlled as described later. If the valve is shut off, the hydraulic liquid in the cylinders is not allowed to escape therefrom to the reservoir and the cylinders cannot yield to the forces acting on the links 90, 91 in the sense of increasing deflection angle. Hence, by shutting the valves in the lines from the cylinders 100, 101 to the reservoir, the relative rotation of the front section 1 and the trailer 2 can be blocked. If the valves (or other valves in the same lines) are shut off only partly, the liquid flow from the cylinder to the reservoir is throttled whereby the relative rotating movement at the hinge is dampened. On the left-hand side, the links 90 and 91 are simply moved apart and maintain their relative positions with respect to the hydraulic cylinders 100 and 101. When vehicle turns in the opposite direction, it makes a left-hand turn the same phenomenon occurs on the left-hand side and the links 90 and 91 of the left-hand side abut and may block or dampen further relative rotation between the vehicle sections 1 and 2.

As is shown in FIGS. 5 and 6 the front section of the vehicle includes a steering station 4 which has a sensor 5 which is mechanically connected to a steering gear arm 111 and senses directly the steering angle which is either "$\alpha$ right" or "$\alpha$ left". The steering angle sensor 50 is connected to a control unit 70 which in turn connects to a hydraulic unit 80 that controls pressure on the cylinders on 100 and 101.

As seen in FIG. 5 the hinge 30 has a sensor 60 associated therewith which senses the deflection angle between the trailer 2 and front section 1. The sensor 60 has an output which leads into the control unit 70.

As FIG. 6 shows, the steering angle sensor 50 senses (via the steering gear arm 111) the steering angle $\alpha$. The deflection angle sensor 60 senses the actual deflection angle "$\beta$ right" or "$\beta$ left" at the hinge unit 30. Both values of the actual angles $\alpha$ and $\beta$ are transmitted to the comparing control unit 70. The deflection angle $\beta$ is a timely function of the steering angle $\alpha$ and can be computed for ideal driving conditions. The comparing control unit 70 computes the ideal value of the deflection angle $\beta$ depending on a certain steering angle $\alpha$ in the actual driving situation. If the actual value of the deflection angle $\beta$ exceeds, to a certain extent, the ideal value of $\beta$ the control unit 70 produces corresponding control signals to the hydraulic control unit 80 which actuates the valves mentioned above and thereby throttles or blocks the liquid flow in the connection to the hydraulic damping cylinders 100 and 101. In the first case, if the liquid flow is throttled, the movement of the damping cylinders 100 and 101 are strongly damped, so that the damping levers 90 and 91 cause the front section 7 of the vehicle to be supported against the trailer 2. A further increase of the deflection angle is strongly damped. In the second case, if the liquid flow is blocked, the damping cylinders 100 and 101 are immovable. The supporting action between the front part 1 of the vehicle and the trailer 2 is rigid in the direction of increasing deflection angle. The vehicle parts are free, however, to decrease the deflection angle, since, as seen in FIG. 3, the mutual support acts only in one angular direction and not in the other.

It is not difficult for a person skilled in computers to design a computer for computing the ideal deflection angle $\beta$ as a timly function of $\alpha$. But it is easier and less expensive to assign only one certain angle $\beta$ to a given value of $\alpha$. The ideal deflection angle in its timely development approximates asymptotically a certain final value of $\beta$ which is always the same for a given steering angle $\alpha$. In many cases, it is sufficient for the purposes of the invention if in the comparing control unit this final value of the deflection angle $\beta$ is computed and is used for comparing with the actual deflection angle. The blocking signal is produced then if the actual deflection angle exceeds that computed final value.

The hydraulical control block 80 produces a certain hydraulic pressure even if the vehicle parts move back into the straight ahead situation. By this pressure the cylinders 100 and 101 and the damping levers 90 and 91 are moved back into their normal position.

If the steering angle $\alpha$ is within a range of 8° to the right or to the left, the hinge unit 30 is damped. This is achieved because the control unit 70 produces a certain damping signal if the steering angle $\alpha$ is within range. The damping signal causes the hydraulic control unit 80 to throttle the liquid flow in the hydraulic connections of the hydraulical cylinders 100 and 101.

If the control unit 70 senses a steering angle $\alpha$ greater than 8° right or left, the damping signal ceases. The hydraulic control unit 80 is consequently caused to finish the damping or throtteling action. The liquid flow from the cylinders 100 and 101 become free and the damping effect is terminated. This means that the vehicle can easily be steered through curves. On the other hand, when driving straight ahead the damping effect is active and removes a certain instability which otherwise might occur.

As long as the actual deflection angle $\beta$ is less or equal to the ideal deflection angle computed in the control unit, no blocking signal is produced by the control unit. If however the actual deflection angle $\beta$ exceeds the ideal deflection angle, a blocking signal is produced by the control unit, which signal causes the hydraulic control unit 80 to close the hydraulic connections of the hydraulical cylinders 100 and 101. The same is the case if the control unit senses angles $\alpha$ and $\beta$ on different sides.

Although the invention has been described and illustrated in detail, it is to be clearly understood that the same is by way of illustration and example only, and is not to be taken by way of limitation.

What is claimed is:

1. A locking system for a hinged vehicle wherein the vehicle has a front section and a rear section which are connected by a hinge between which determines the deflection angle, wherein the front section has a pair of passive axles for supporting a set of fixed rear wheels and a set of steerable front wheels between which determines the angle of lock upon steering the front wheels, and wherein the rear section has a single powered axle which powers a set of wheels for driving the vehicle, the locking system preventing the front and rear section from exceeding a maximum deflection angle predetermined for each angle of lock when cornering, the locking system comprising at least one sensing means for sensing the angle of lock and the deflection angle of said hinge, wherein said sensing means is connected with comparing means for sensing the maximum predetermined deflection angle of said hinge for each angle of lock, and hinge locking means having a hinge locking mechanism disposed around the hinge and between the front section and the rear section, said hinge locking means being operative by the comparing means in one direction against enlargement of the deflection angle greater than the maximum deflection angle of said hinge which is predetermined upon reaching the maximum steering deflection angle for the angle of lock, the hinge normally being unlocked under normal driving conditions.

2. The system of claim 1, including computer means for computing the maximum angle of deflection at a predetermined angle of lock.

3. The system of claim 1, wherein said hinge locking means is a piston-cylinder arrangement.

4. The system of claim 3, wherein said piston-cylinder arrangement includes hydraulically interconnected locks and a controllable non-return valve for locking said arrangement.

5. The system of claim 1, wherein said hinge locking means remains operative before an angle of 0° upon receding of the deflection angle.

6. The system of claim 1, wherein said sensing means for the deflection angle causes an operation of the hinge locking means upon non-continuous change of the deflection angle.

7. In a hinged vehicle wherein the vehicle has a front section and a rear section which are connected by a hinge between which determines the deflection angle, wherein the front section has a pair of passive axles for supporting a set of fixed rear wheels between which determines the angle of lock upon steering the front wheels and a set of steerable front wheels, and wherein the rear section has a single powered axle which powers a set of wheels for driving the vehicle, the vehicle including:

means for locking the hinge during cornering of said vehicle comprising, means for sensing the deflection angle and the angle of lock, comparing means for sensing the deflection angle and the angle of lock, comparing means for sensing the maximum predetermined deflection angle for the angle of lock, a locking mechanism for said hinge disposed around the hinge and between the front section and the rear section and operative upon reaching a maximum predetermined deflection angle between the front section and rear section predetermined by the angle of lock, said means for locking the hinge operative in one direction against the increase of the maximum deflection angle, said hinge normally being unlocked under normal driving conditions.

8. In a hinged vehicle wherein the vehicle has a front section which is connected by a hinge to a rear section so that the deflection angle between the front and rear sections may vary, wherein the front section has a pair of passive axles for supporting a set of fixed rear wheels and a set of steerable front wheels, and wherein the rear section has a single powered axle which powers a set of wheels for driving the vehicle, the vehicle including:

means for monitoring the deflection angle between the front section of the vehicle and the rear section of the vehicle;

means for monitoring the steering angle of the front wheels with respect to the axis of the front section;

means for resisting angular deflection between the front and rear sections of the vehicle disposed between the front and rear sections wherein said resisting means assumes a dampening mode which dampens the angular deflection and a blocking mode which blocks the angular deflection;

means for comparing the steering angle to a predetermined steering angle and for generating a signal when the steering angle exceeds the predetermined steering angle; and means for switching the resisting means from the dampening mode to the blocking mode upon generation of said signal.

9. The hinged vehicle of claim 8 wherein the resisting means includes:

link means having oppositely disposed links pivoted to each section on both sides of the hinge, hydraulic means pivoted at one end to the link means and at the other end to the sections, wherein engagement between the hydraulic means and link means on the front and rear sections and on the same side of the hinge resists increase in the angle of deflection.

* * * * *